May 26, 1931.　　　H. M. CAMERON　　　1,806,742
PROJECTING SCALE
Filed Aug. 22, 1929　　　3 Sheets-Sheet 1
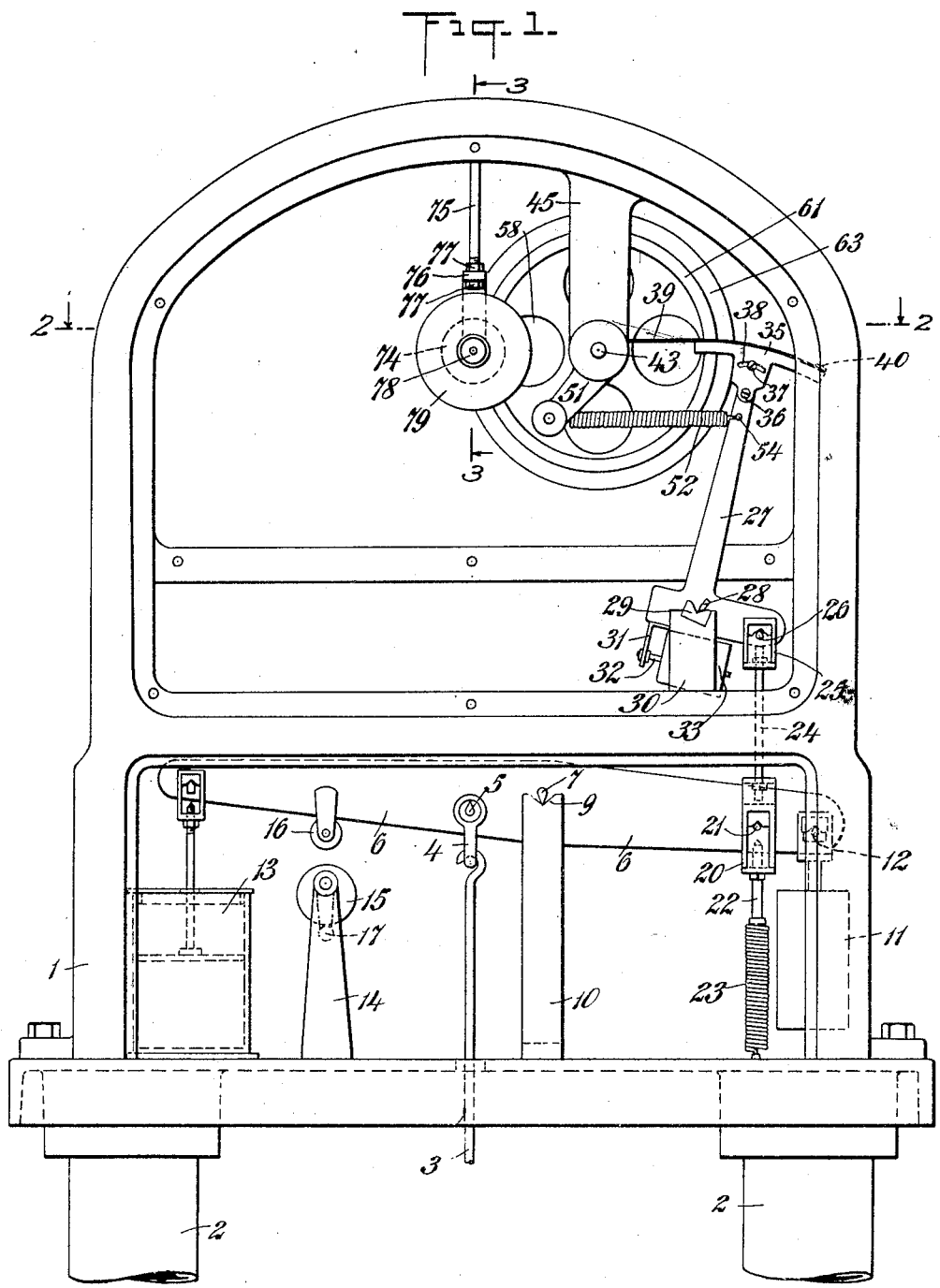
INVENTOR
HUGH M. CAMERON
BY J. S. Wooster
ATTORNEY May 26, 1931.　　　H. M. CAMERON　　　1,806,742
PROJECTING SCALE
Filed Aug. 22, 1929　　　3 Sheets-Sheet 2
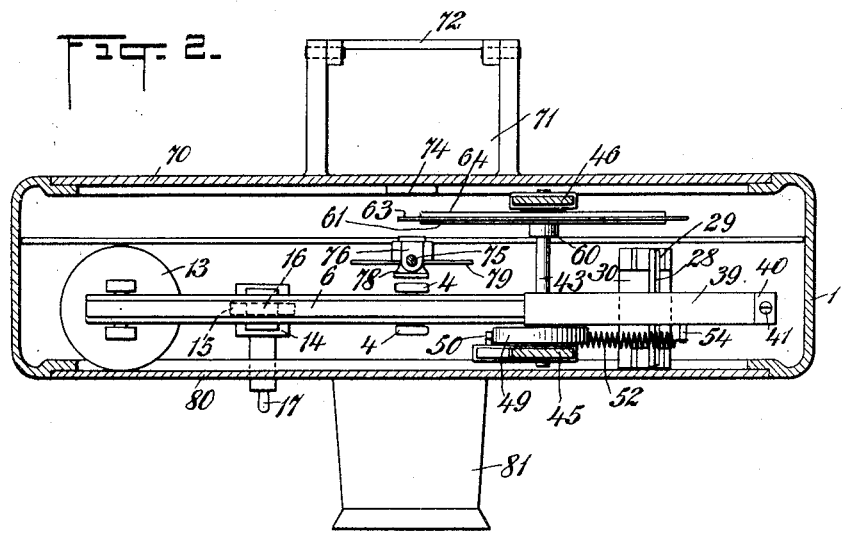
INVENTOR
HUGH M. CAMERON
BY
J. S. Wooster
ATTORNEY May 26, 1931. H. M. CAMERON 1,806,742
PROJECTING SCALE
Filed Aug. 22, 1929 3 Sheets-Sheet 3
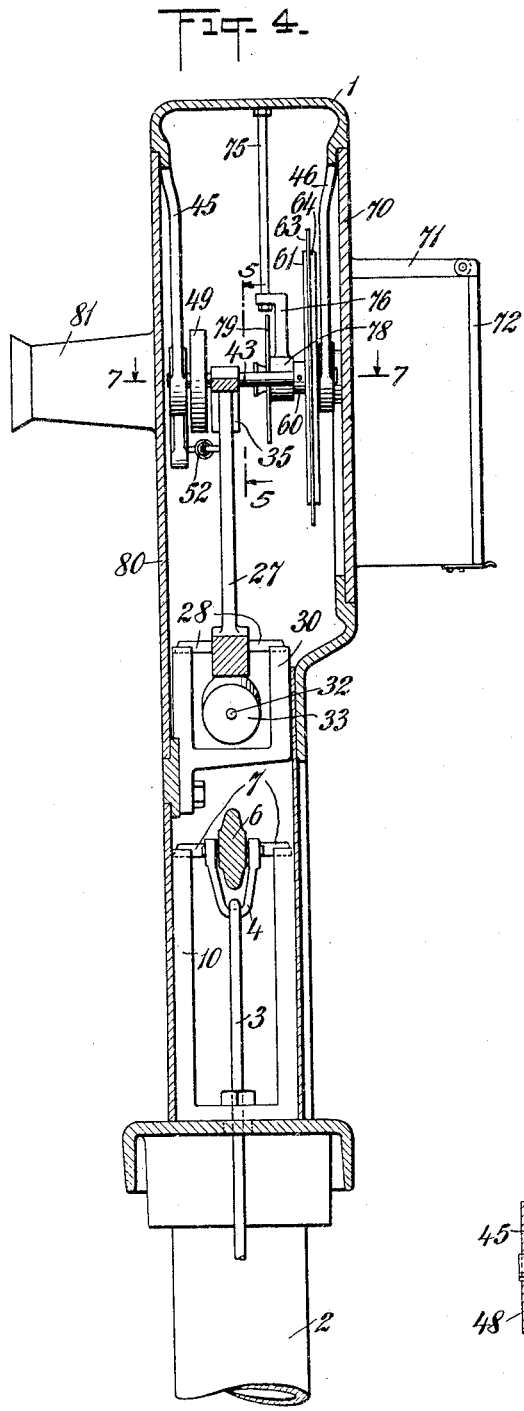
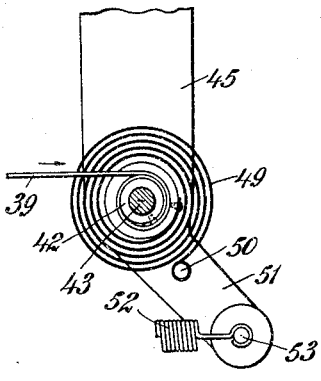
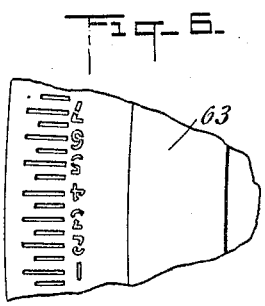
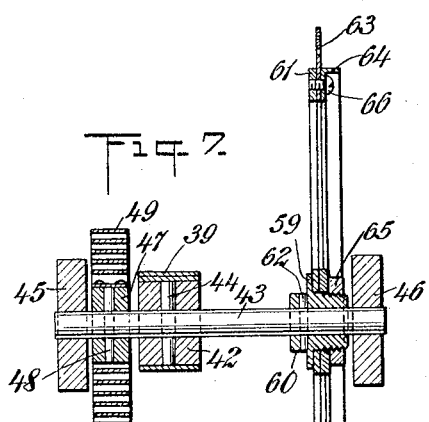
INVENTOR
HUGH M. CAMERON
BY
J. S. Wooster
ATTORNEY Patented May 26, 1931

1,806,742

UNITED STATES PATENT OFFICE

HUGH M. CAMERON, OF WOODHAVEN, NEW YORK, ASSIGNOR TO JOHN CHATILLON & SONS, OF NEW YORK, N. Y., A CORPORATION OF NEW YORK

PROJECTING SCALE

Application filed August 22, 1929. Serial No. 387,605.

This invention relates to weighing scales of the type which indicates the weight in large figures upon a screen, such a scale being more generally known as a projecting scale.

An object of this invention is to provide a scale which accurately indicates the weight in large easily legible figures and which is of superior accuracy.

Another object of this invention is the provision of a scale construction which is not bulky and which can be economically manufactured and requires a minimum of manual adjustment.

A further object is to provide a scale so arranged that figures of an easily legible size may be projected upon a screen without using such a great focal length that mirrors and other reflecting devices are necessary to increase the length of the path of light traveling from the indicating dial to the screen, or employing a casing for the scale out of all proportion in size to the rest of the scale.

Heretofore the projecting scales generally known have used the "pendulum" type of balance to actuate the movable indicating means, a great drawback of such a scale being that correct movement of the indicating means can only be accomplished through an angle of comparatively few degrees. An object of this invention is to provide a scale structure wherein a circular indicating dial can be turned substantially a full revolution thus enabling the graduations to be spread out over a much greater space.

My scale comprises a member adapted to be moved proportionately to the load applied to the scale, a circular dial bearing weight indicia, means for turning said dial, means fastened to the member adapted to control the turning of said dial on movement of the member, a screen, and means for projecting the weight indicia on the screen. I prefer to use a thin metal annular ring with weight indicia perforated in the outer portion thereof, usually by etching for my indicating dial. Preferably, I use a strap means, to be more particularly described hereinafter, to connect the indicating dial with the movable member whereby the turning of the dial is controlled.

Still another object of this invention is to provide a projection scale employing an opposed spring system of the type described in my co-pending application Serial No. 247,055, filed January 16, 1928, opposed springs being used to actuate the indicating dial in direct proportion to any load applied to the platform.

Other objects and advantages will be apparent from the following description, in which reference is had to the accompanying drawings illustrating the preferred embodiment of my invention and wherein similar reference numerals designate similar parts throughout the various views.

Fig. 1 is a front elevation of a scale embodying the invention, the load platform and base not being shown, and the front and back faces of the casing being removed.

Fig. 2 is a section on the line 2—2 of Fig. 1 with the faces of the casing in position.

Fig. 3 is an enlarged section on the line 3—3 of Fig. 1 with the faces of the casing in position.

Fig. 4 is a side elevation in section of the scale, the load platform and base not being shown.

Fig. 5 is an enlarged section on the line 5—5 of Fig. 4.

Fig. 6 is a fragmentary detail of the graduated metal dial with the graduations cut out.

Fig. 7 is an enlarged section on the line 7—7 of Fig. 4.

In the scale illustrated in the drawings 1 designates the casing which houses the indicating mechanism hereinafter to be described. This housing is supported on posts 2, 2 of the base of the scale. The load platform and base of the scale may be of any conventional design and are not illustrated here. The steelyard rod 3, connected at its lower end to any conventional leverage upon which the load platform is carried, is attached to yoke 4 pivoted on oppositely disposed knife edges 5 on the power side of a first class weighing lever 6. The lever 6, carrying the oppositely disposed knife edges 7, is pivoted on the main knife edge bearings 9 of the U-shaped member 10 mounted on the floor of casing 1. A counterweight 11 is hung on the knife edges 12 at the weight end of the weighing lever 6 and the power end of the lever cooperates with the dash pot 13.

To lock the leverage system when the scale is not in use, or being moved, etc., a bracket 14 in which is journaled cam 15 is provided on the floor of the casing. The cam cooperates with the roller 16 carried by the weighing lever 6 to lock it in one position of the cam and free it in the opposite position. Crank 17 is provided to turn the cam.

A yoke member 20 carried by oppositely disposed knife edges 21 toward the weight end of lever 6 has a stud 22 threaded in its lower end and this stud is connected to the spiral spring 23 secured to the floor of the casing, whereby it is adapted to lengthen upon application of a load to the scale. The link 24 threaded in the upper part of yoke member 20 is attached to a second yoke 25 pivoted on knife edges 26 carried by the shorter arm of L-shaped lever 27. This lever 27 is carried by knife edges 28 disposed in knife edge bearings 29 of the support 30 fastened to the front wall of casing 1. (See Fig. 4.) A bracket 31 carrying threaded stem 32 on which counter weight 33 is disposed, is secured to the lower surface of member 27. A strap anchoring member 35 is pivotally mounted at 36 on the long arm of lever 27 and is held in predetermined position by set screw 37 passing through the arcuate slot 38 in member 35. A strap 39 is anchored at one end of the member 35 by means of strip 40 and screw 41 (see Fig. 2). The other end of strap 39 is anchored on the reel 42 fixed on shaft 43 by pin 44 (see Figs. 5 and 7). The shaft 43 is journaled in front and rear depending brackets 45 and 46 carried by the casing 1 so that it runs horizontally from front to rear of the casing. Toward the front end of shaft 43 a second reel 47 is fixed by means of pin 48 passing through shaft 43; the inner end of a coil spring 49 is anchored on this reel 47, the outer end being anchored by stud 50 carried on the arm 51 of the front bracket 45. A spiral spring 52 at one end is hooked over a stud 53 carried by arm 51 and at the other end is secured to the L-shaped member 27 by pin 54, thereby being adapted to shorten upon application of a load to the scale.

In the above described arrangement spiral spring 52 and coiled spring 49 are opposed to spiral spring 23, the first two springs shortening on application of a load while spring 23 lengthens. In this opposed spring system the springs 49 and 52 must just balance spring 23 and the excess weight of the parts in the leverage system to the right of knife edges 28 (Fig. 1), which is the pivot for this leverage system, at the zero position of the scale. Until a load is applied to the load platform, the knife edges 21 carried by weighing lever 6 do not influence the leverage system pivoted at knife edges 28. As explained in my copending application, Serial No. 247,055, filed January 16, 1928, the springs 49 and 52 must be lengthened sufficiently at the zero position of the scale so that they will still have a tendency to shorten at the full capacity position of the scale, while spring 23 must be under some tension at the zero position of the scale. By observing these conditions, the spring 23 will always lengthen on application of load while springs 49 and 52 are shortening, and thus inequalities in the lengthening of spring 23 per unit of weight will be offset by the corresponding inequality in shortening of springs 49 and 52.

Spring 49 is very weak as compared to spring 52, having strength enough merely to turn shaft 43 a complete revolution when permitted by the L-shaped member 27 moving to the left as viewed in Fig. 1. Although spring 49 is comparatively weak, it must be considered in adjusting the strength of spring 52 to balance spring 23.

A hub 60 having the flange 59 made integral therewith and exteriorly threaded on the right hand side of said flange 59 (see Fig. 7) is fixed by pin 62 on shaft 43 adjacent the rear bracket 46. A bracing disc 61 having its center cut away, is mounted on the hub 60 and held tightly against flange 59 by nut 65 disposed on the threaded portion of hub 60. This disc 61 has cut out portions 58 (see Fig. 1) to reduce its weight as much as possible without losing its rigidity. A flat annular dial 63, bearing weight indicia along its outer circumference, is held fast between the bracing disc 61 and a rigid rim 64 by means of screws 66 passing through the rim 64 and the dial into the disc 61. As shown in Fig. 7, the outer portion of this dial bearing weight indicia projects beyond the periphery of disc 61 and rim 64.

Preferably my dial is made of a thin sheet of metal with the graduations etched through or perforated as shown in Fig. 6 although it may be the conventional photographic film strip with the weight indicia photographed from a model. In either case the outer portion of the dial having the weight indicia marked thereon extends beyond the periphery of disc 61 and rim 64. As the hub 60 is fixed on shaft 43, the indicating dial will turn in proportion to the load on the platform.

According to this invention, the space on the dial for marking graduations is so enormously increased over the space on the indicating chart of the heretofore known projecting scales, which are adapted to be moved through an angle of only comparatively few degrees, that the weight indicia may be made large enough to utilize a straight projection of the weight indicia on a screen without the usual mirrors to give sufficient focal length in a reasonably proportioned casing.

In the scales of this type heretofore known, the load applied to the platform was used to turn a pointer or dial and for this reason pointers or dials of extremely small size had to be used to make an accurate scale. In my scale the load is not used to turn the dial, the dial being turned by the coiled spring 49, although controlled by the movement of L-shaped member 27. By this arrangement the dial and its associated parts may be of comparatively greater size without influencing the accuracy of the scale.

Referring more particularly to Figs. 2, 3 and 4, 70 indicates the rear plate of casing 1 and carries the light proof box 71 having the hinged door 72. In this box is disposed a suitable illuminant such as the electric light 73 opposite a condenser 74 carried by the rear plate 70. A threaded rod 75 depending from casing 1 supports a bracket 76 held in predetermined position by adjusting nuts 77. The bracket 76 carries the focusing lens 78 and a wide opaque disc 79 adapted to cut off any light from the illuminant not passing through the focusing lens. The front plate 80 of casing 1 is provided with a forwardly projecting hood 81 carrying a ground glass screen 82 on which the weight indicia are to be projected. Any other translucent material may be used for the screen. The condenser 74, focusing lens 78 and screens 82 are positioned in a straight line and their position is so determined that the outer rim of the indicating dial 63 bearing the weight indicia passes between the condenser and focusing lens at right angles to a line passing through their centers.

To facilitate reading the weight of the load a horizontal line is drawn across screen 82 to show where the reading should be taken.

The invention claimed is:

1. In a projecting scale, a member adapted to be moved proportionately to the load applied to the scale, a metal circular dial having weight indicia perforated therein, means for turning said dial, means fastened to said member and adapted to control the turning of said dial, a screen, and means for projecting the weight indicia on the screen.

2. In a projecting scale, a member adapted to be moved proportionately to the load applied to the scale, a circular dial bearing weight indicia, means for turning said dial, strap means fastened to said member and adapted to control the turning of said dial, a screen, and means for projecting the weight indicia on the screen.

3. In a projecting scale, a member adapted to be moved proportionately to the load applied to the scale, a circular dial bearing weight indicia, means for turning said dial a full revolution, strap means fastened to said member and adapted to control the turning of said dial for substantially a full revolution on movement of said member from its zero load position to its capacity load position, a screen, and means including a source of light and lenses for projecting the weight indicia on the screen.

4. In a projecting scale, a member adapted to be moved proportionately to the load applied to the scale, a shaft, a circular dial bearing weight indicia fixed on said shaft, a reel fixed on said shaft, means for turning said shaft, strap means fastened at one end to said member and at the opposite end to said reel, said strap means being coiled around said reel at least one complete turn, the distance between the zero load position and capacity load position of said member and the diameter of the shaft being so proportioned that the turning of said dial is controlled for a complete revolution by said strap means on movement of said member from the zero load position to its capacity load position, a screen, and means for projecting weight indicia on the screen.

5. In a projecting scale, the combination with a weighing lever, of a second lever, a circular dial bearing weight indicia, means for turning said dial, means fastened to one end of said second lever adapted to control the turning of said dial upon movement of said second lever, spring means adapted to lengthen upon application of a load to the scale connected to said second lever, a second spring means adapted to shorten upon application of a load to the scale attached to said second lever, said second spring means being sufficiently lengthened at the zero load position so that it will still tend to shorten at the maximum load position of the scale and being balanced by the first spring means at the zero load position of the scale, means connecting said first spring means to the weighing lever to yieldingly resist movement of said lever upon application of the load, a screen, and means for projecting the weight indicia on the screen.

6. In a projecting scale, the combination with a weighing lever, of a second lever, a circular dial bearing weight indicia, means for turning said dial, means fastened to one end of the second lever adapted to control the turning of said dial upon movement of said second lever, spring means adapted to lengthen upon application of a load to the scale connected to said second lever on one side of its fulcrum, a second spring means adapted to shorten on application of a load to the scale attached to said second lever on the opposite side of its fulcrum, said second spring means being sufficiently lengthened at the zero load position so that it will still tend to shorten at the maximum load position of the scale and being balanced by the first spring means at the zero load position of the scale, means connecting said first spring means to the weighing lever to yieldingly resist movement of said lever upon application of the load, a screen, and means for projecting the weight indicia on the screen.

Signed at New York in the county of New York and State of New York, this 20th day of August A. D. 1929.

HUGH M. CAMERON.